DON CARLOS WISELEY.
AUTOMATIC MECHANISM FOR OPERATING CAMERA BULB OR CONTACT RELEASE.
APPLICATION FILED SEPT. 9, 1913.
1,155,981.
Patented Oct. 5, 1915.
2 SHEETS—SHEET 1.
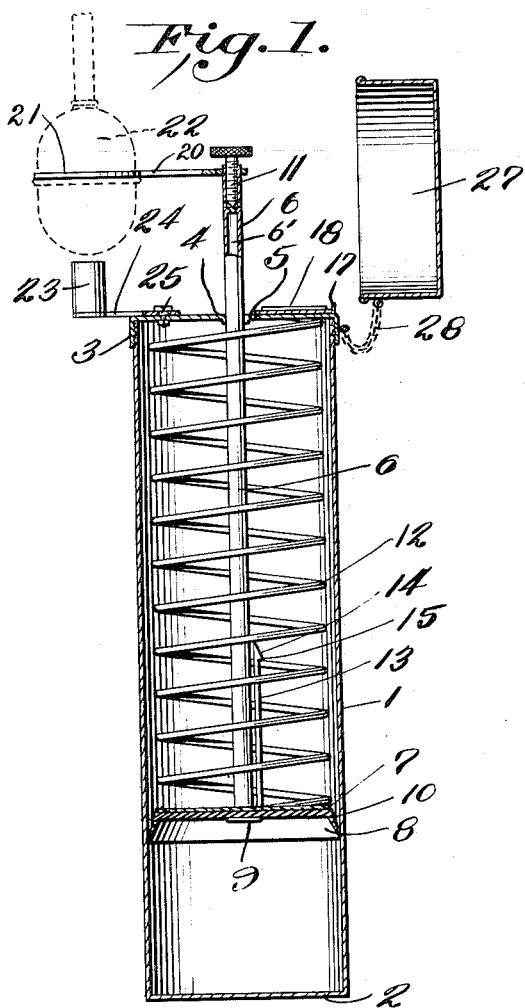
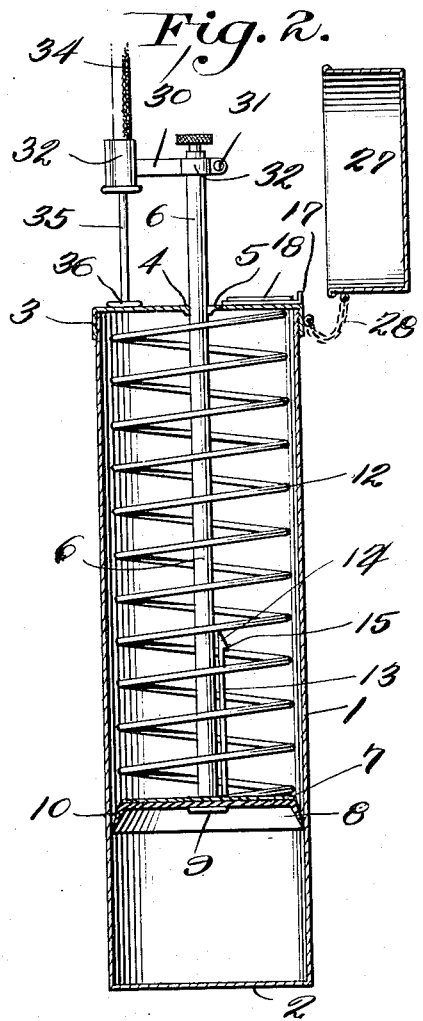
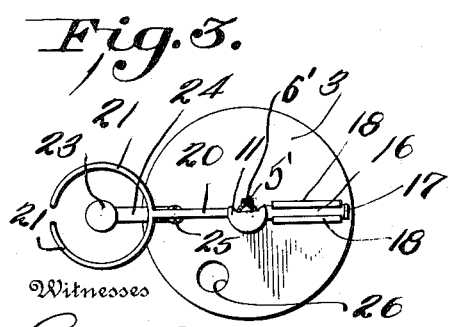
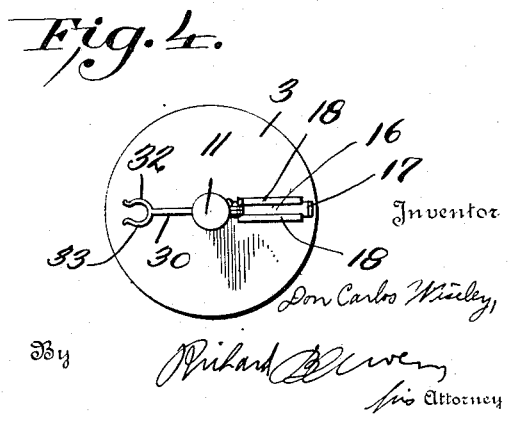

DON CARLOS WISELEY.
AUTOMATIC MECHANISM FOR OPERATING CAMERA BULB OR CONTACT RELEASE.
APPLICATION FILED SEPT. 9, 1913.
1,155,981.
Patented Oct. 5, 1915.
2 SHEETS—SHEET 2.
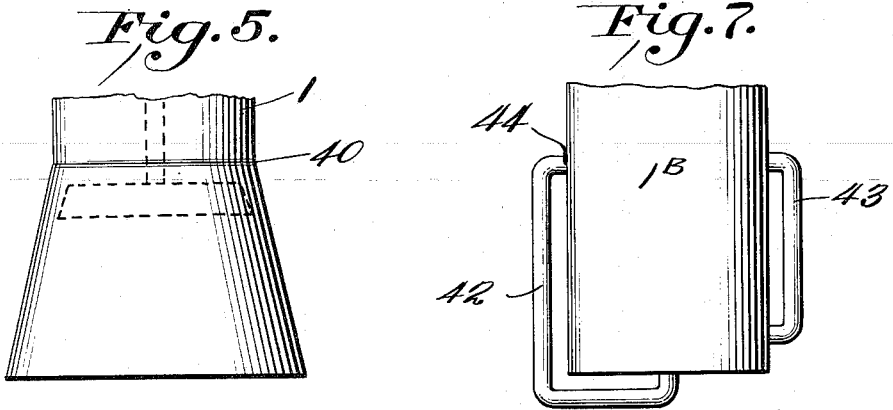
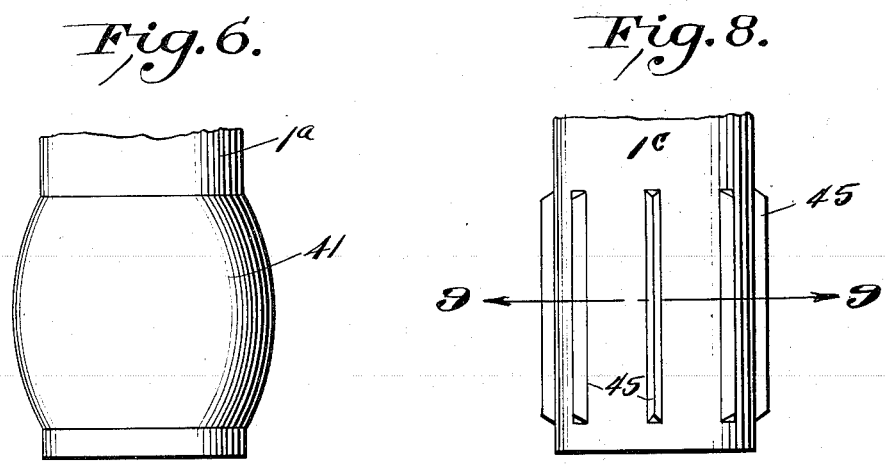
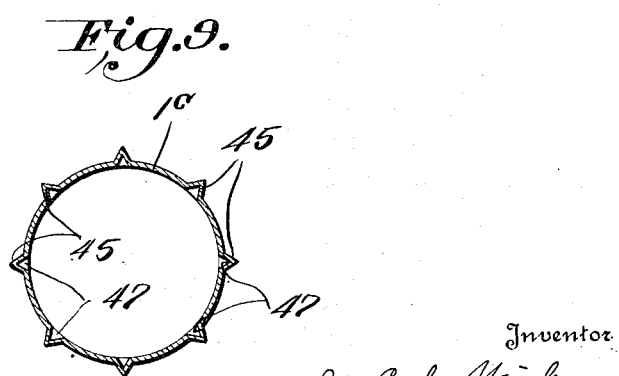

UNITED STATES PATENT OFFICE.

DON CARLOS WISELEY, OF SPOKANE, WASHINGTON.

AUTOMATIC MECHANISM FOR OPERATING CAMERA BULB OR CONTACT RELEASE.

1,155,981.   Specification of Letters Patent.   Patented Oct. 5, 1915.

Application filed September 9, 1913. Serial No. 788,949.

*To all whom it may concern:*

Be it known that I, DON CARLOS WISELEY, a citizen of the United States, residing at Spokane, in the county of Spokane and State of Washington, have invented certain new and useful Improvements in Automatic Mechanism for Operating Camera Bulb or Contact-Release, of which the following is a specification.

This invention relates to photographic cameras, and more particularly to means for automatically operating the bulb or contact release of photographic cameras.

It is frequently desired by those operating cameras to appear in the picture that is taken, and it often occurs that groups that are photographed in commemoration of a party or a gathering of friends or the like are considered incomplete as to such party or group for the reason that one of the party is required to remain out of the group in order to operate the camera at the time the exposure is made.

It is therefore the primary object of this invention to enable such a person, by means of the device constituting this invention, to arrange all the details, such as grouping, proper adjustment of the camera, etc., and then by connecting the device to the camera, and properly adjusting it he will be afforded ample time to assume his position in the group before the device automatically operates the camera and takes the photograph. As is obvious, the device may be used for taking scenic or other views in which the operator desires to appear.

The object of this invention is carried out by providing means wherein is involved the principle of storing energy to be used at an approximately predetermined time to operate camera bulbs or contact releases, the usual means provided for actuating camera shutters.

Another object of this invention is the provision of a device of this nature which is applicable to be used in connection with all makes and sizes of cameras now upon the market, in connection with which a bulb or contact release may be utilized for operating the camera shutter, and further to so construct the device so that the same may be attached to the camera and operate it by means of the ordinary bulb or contact release which forms a part of the camera.

In carrying out this invention, it is necessary to provide mechanism which will operate the camera shutter without disturbing the camera so that the image upon the negative will be clear. By this invention the operation of the shutter is effected without jarring the camera and the operation is as positive as if initiated by hand.

Another object of this invention is the provision of metallic tubes, forming a body portion for a device of this nature, which have various shaped contours so as to more efficiently regulate the operation of the device, thereby meeting the requirements of various types of cameras.

A still further object of this invention is the provision in the construction of a device of this nature whereby all rough or protruding members may be inclosed within a cover, when not in use, so that the device may be more conveniently carried about.

With the foregoing and other objects in view, this invention consists in such novel features of construction, combination and arrangement of parts as will be hereinafter more fully described, illustrated in the accompanying drawings and claimed.

In describing the invention, reference will be had to the accompanying drawings wherein like characters of reference designate like or corresponding parts throughout the several views, and in which, Figure 1 is a longitudinal sectional view of the mechanism showing it used with the ordinary bulb for operating shutters; Fig. 2 is a view similar to that of Fig. 1 only showing it used with a contact release for operating camera shutters; Fig. 3 is a top plan view of Fig. 1; Fig. 4 is a top plan view of Fig. 2; Figs. 5, 6, 7 and 8 are detailed views of the end of the tube constituting the body portion of the device showing various methods for permitting the escape of the air within the tube and below the piston. Fig. 9 is a cross sectional view on the line 9—9 of Fig. 8.

Referring now to camera bulb: The reference refers more particularly to the ordinary hollow rubber ball or bulb with a tube for connecting to cameras, but refers also to any manner of means providing the same constitutes an air retainer provided with means for connecting to any member or members of a camera or accessory thereof, and that if a pressure be exerted upon any of the sides of said air retainer, the same will increase the pressure of air contained in said air retainer; all of which will be referred to hereinafter as camera bulb.

By contact release is meant mechanism for conducting motion or movement from a point of initiation to a point of utilization said point of utilization being provided with means for connecting to any member or members of a camera or accessory thereof. The name, "contact release", is that by which it is commercially known though it may have other or various trade names, but will be referred to hereinafter only as contact release.

By means for engaging camera bulb or contact release, is meant a provision in a device of this nature for contactly engaging an attachment to said camera bulb or contact release, and the contour and nature of the means described hereinafter is such as to meet the requirements of those commonly used, however, certain minor changes in the contour or construction of parts may be necessary in certain practical fields. The above will be referred to hereinafter as means for engaging camera bulb or contact release.

Referring more particularly to the drawings, 1 designates a metallic tube which has its lower end 2 hermetically closed and its upper end provided with a removable cap 3. The tube 1, which is shown in Figs. 1 and 2 of the drawings, is cylindrically shaped having its contour perfectly smooth and exempt from any type of projections, by-passes or the like.

The cap 3 is provided with an opening 4 centrally located therein which opening has a small square cut out portion 5 communicating therewith and also a small tongue 5' projecting therefrom. A rod 6 is slidably seated in the opening 4 and has a small rib 6' throughout the length of one side which rib fits in the notch 5' leading from the opening 4, said rib and notch providing means for preventing the rod 6 from rotating within the opening 4. A thin metallic plate 7, forming a piston, is mounted upon the lower end of the rod 6. The plate or piston 7 has a leather washer 8 contacting with its under surface, which washer is held in place by means of an annular flange 9 which is formed upon the lower end of the rod 6 which flange engages the inner surface of the center of the washer 8, thereby securely holding it in place.

The side 10 of the leather washer 8 extends downwardly and flares outwardly, decreasing in thickness so as to form an air tight connection between the sides of the tube 1 and the washer 8, thereby providing practically an air tight compartment between the washer 8 and the bottom 2 of the tube 1 when the needle valve 11 is closed.

The needle valve 11 is mounted in the upper end of the rod 6, which is hollow, and provides a variable outlet for the air from the compartment which is formed between the washer 8 and the bottom 2 of the tube 1. By regulating the needle valve 11, the amount of air permitted to escape from the compartment formed by the washer 8 and the bottom 2 may be controlled at will.

An expanding coil spring 12 is disposed about the rod 6, having its upper end engaging the inner surface of the cap 3 and its lower end engaging the piston 7.

The piston 7 has a catch 13 secured thereto which catch extends upwardly into the tube 1 and parallel with the rod 6. The catch 13 is constructed of spring sheet metal having an enlarged head 14 which is provided with a shoulder 15 thereon. When the piston 7 and the rod 6 are pulled upwardly, the catch 13 moves through the cut out portion 5 of the opening 4 until the pull has been released when the spring 12 will force it downwardly until the shoulder 15 of the catch 13 engages the cap 3 thereby holding the piston and rod in an upward position against the tension of the spring 12. Releasing means 16, which embodies a flat member 17, slidably mounted in guideways 18, is mounted upon the upper surface of the cap 3 and in a position so that when the flat member 17 is pressed inwardly the inner end of the same will engage the head 14 of the catch 13 and force it inwardly thereby moving the shoulder 15 out of engagement with the cap 3 and permitting the spring 12 to force the piston 7 and the rod 6 downwardly.

An arm 20 is connected to the upper end of the rod 6 and has a pair of substantially semi-circular shaped arms 21 hingedly or detachably connected to its outer end and which form a carrier or support for the camera bulb 22. When it is desired to operate the camera shutter, the arms of the supporting arm 20 attached to the piston 7 by means of the rod 6 is pulled upwardly against the tension of the spring 12 until the shoulder 15 of the catch 13 engages the cap 3. The bulb 22, attached to the camera, is placed between the semi-circular arms 21 and the device is then ready to operate the shutter. By forcing the shoulder 15 out of engagement with the cap 3, by means of the releasing mechanism 16, the spring 12 will force the piston 7 and the washer 8 to which is attached, by means of the rod 6, the carrier 21 containing the bulb 22, downwardly against the force of the air which is confined within the compartment between the washer 8 and the bottom 2 of the tube 1. As the speed with which the piston travels downwardly depends upon the amount of air allowed to escape through the needle valve 11, except a little that may leak or seap through between the washer 8 and the sides of the tube, the time consumed while the piston is traveling downwardly may be approximately gaged by the needle valve 11, a greater or lesser opening giving it a greater or less time. When the piston 7 and the washer 8 reach a predetermined point in their downward movement, the lower end of the bulb 22 will contact with the post 23, forming a striking base for the bulb and which is detachably connected to an arm 24 directly beneath the carrier 21. The arm 24 is pivotally secured at 25 to the cap 3. When the bulb 22 contacts with the post 23 the bulb will be compressed, forcing the air upwardly through the tube to a camera shutter or accessory when attached thereto, thereby operating the camera shutter or accessory thereof. Thus the device, when used in combination with a camera bulb, provides means for automatically operating a camera or camera accessory at an approximately predetermined time.

The cap 3 is provided with an opening 26 formed therein which receives the post 23. A cover 27 is loosely connected to the cap 3 by means of the chain 28 or otherwise, and when the post 23 has been detached from the arm 24 and inserted in the opening 26, the arm 24 turned inwardly toward the rod 6 upon its pivotal connection at 25 and the arms 21 removed from or turned under the arm 20, the cover 27 may be placed over the cap 3, forming a protection for the various parts of the device which are ordinarily exposed, thereby materially decreasing the chance of accidentally disarranging any of the exposed parts and making it more convenient when it is desired to carry the device about.

In Figs. 2 and 4 of the drawings, a different type or modified form of supporting arm is shown the same constituting an arm 30 which is clamped to the upper end of the rod 6 and secured by the bolt 31. The outer end of the arm 30 is forked, and the arms 32 and 33 formed upon the forked end yieldably and frictionally engage a portion of the contact release.

The contact release constitutes a tube 34 which has a rod or flexible wire (not shown) extending longitudinally therethrough. The end of the release not shown is provided with means for connecting to a member of a camera or a camera accessory. The end of the tube farthest from the camera is provided with a metal casing the same providing a guide for the pin 35 which is secured to the rod or flexible wire (not shown). A head 36 is formed upon the outer end of the pin 35.

By forcing the pin 35 inwardly into the tube 34, or the tube 34 downwardly over the pin 35, movement will be transmitted throughout the length of the tubing or the rod or the flexible wire, in that their previous relative position will be shifted with respect to each other, said movement or change of relative position being utilized in the operation of camera shutters and accessories. The contact release is attached to the mechanism heretofore described by means of the frictional engagement between the arms 32 and 33, and when the piston 7, the rod 6 and the arms 32 and 33, in which is held the contact release, reach a predetermined point in their downward movement, the head 36 will engage the upper surface of the cap 3 and further downward movement of the piston 7, the rod 6 and the arms 32 and 33 will force the pin 35 inwardly into the tube 34.

The method of operating the mechanism is the same as for that described in using the device in combination with a camera bulb. Thus the invention of a device of this nature provides means, when used in combination with a contact release, for automatically operating a camera or camera accessory at an approximately predetermined time. Now then, as will be clearly seen, an arm, such as 30 of Fig. 2 heretofore fully described, may be secured directly below and at right angles to the arm 20 upon the rod 6 of the mechanism illustrated in Figure 1 and heretofore fully described. Therefore the invention of such a combination of parts provides means for auotmatically operating a camera or camera accessory at an approximately predetermined time when used in combination with a camera bulb, contact release or both camera bulb and contact release.

In Figs. 1 and 2 of the drawings, the escape of the air which is confined in the compartment formed by the washer 8 and the bottom 2 of the tube is through the valve 11 located in the rod 6 and what small amount may leak or seep through between the washer 8 and the sides of the tube. This will in some instances be of sufficient amount to permit of the piston and washer moving downwardly the necessary amount for operating certain types of camera shutters.

In Figs. 5, 6, 7, 8 and 9 of the drawings, various modified forms of the end of the tube are shown. These various shapes are provided for different types of cameras where a greater amount of force is necessary to operate the camera shutter and which necessitate a sudden or quick action of the piston to efficiently operate the bulb or contact release. By such a provision the air between the piston and the sides and the end 2 of the tube, when said piston has reached a predetermined point in its downward movement, will be allowed to escape freely around the piston and into the other end of the tube, thus the pressure of the spring 12 will be exerted more directly upon the bulb or contact release. In Fig. 5, the lower end of the tube 1' is shown as flared outwardly so that when the piston and washer pass the point 40, which is the conjunction between the cylindrical and flared portion of the tube, the same will move quickly thereby administering a sudden or quick impulse to the bulb or contact release.

In Fig. 6 the end 41 of the tube 1ª is bulged outwardly and this bulging is provided for the same purpose as the flaring of the tube 1'.

In Fig. 7 of the drawings, the tube 1ᵇ has by-passes 42 and 43 connected thereto and extending along the sides of the same. The by-pass 42 communicates with one side and the lower end of the tube allowing the air to be forced upwardly through the by-pass into the upper portion of the tube after the piston and washer have passed the point 44, at which point the upper end of the by-pass communicates with the tube. The by-pass 43 has both its ends terminating in the sides of the tube instead of one in the side and the other in the end as does the by-pass 42, and the purpose and functions of the by-pass 43 are identical with those of the by-pass 42 as well as the bulge 41 and the flared end of the tubes 1ª and 1'.

The contour of the tube 1ᶜ shown in Fig. 8, is provided with a plurality of outstruck portions 45 which may be substantially triangular shaped, as is shown in the drawings, or semi-circular shaped or any of many different types of shape as should be desired, provided a similar by-pass or air passage way 47 is formed along the sides of the tube to permit the air to pass upwardly out of the compartment formed between the piston and the end of the tube into the upper portion of the same.

From the foregoing description taken in connection with the accompanying drawings, the advantages of construction and the method of operation of the means for automatically operating camera shutters or accessories in combination with a camera bulb or contact release, will be readily apparent to those skilled in the art to which this invention appertains and, while in the foregoing description, the principle of the operation of this invention has been described, together with various features of construction, it is to be understood that certain minor features of construction, combination and arrangement of parts may be altered to suit practical conditions, provided such alterations are comprehended within the scope of what is claimed.

What is claimed is:—

1. In a device of the character described a cylinder having closed ends, a piston slidably mounted in said cylinder, a plunger extending from said piston through an opening formed in one end of said cylinder, said opening having an offset leading therefrom, a resilient catch extending from said piston and passing through the cutout leading from the opening in the cylinder head when said plunger is drawn outwardly, means for moving said resilient catch to an inoperative position, and means for yieldably holding said piston in a normal position.

2. A device of the character described including a cylinder, a piston slidably mounted in said cylinder, a plunger extending from said piston through the head of said cylinder, resilient means extending from said piston for engaging the head of said cylinder to releasably hold said piston in a set position and means for returning said piston to its normal position when said resilient means is moved to an inoperative position.

3. A device of the character described including a cylinder having a head, a piston slidably mounted in said cylinder, resilient means carried by said piston for engaging the head of said cylinder to releasably hold said piston in a set position, and means for returning said piston to its normal position when said resilient means is moved out of engagement with the head of said cylinder.

In testimony whereof I affix my signature in presence of two witnesses.

DON CARLOS WISELEY.

Witnesses:
A. G. ELSTON,
C. O. TEISBERG.